United States Patent
Hyun

(10) Patent No.: US 6,964,387 B2
(45) Date of Patent: Nov. 15, 2005

(54) APPARATUS FOR PREVENTING BACKLASH OF SPOOL USED IN BAITCASTING REEL

(75) Inventor: Kang ho Hyun, Bucheon (KR)

(73) Assignee: Doyo Engineering Co., Ltd., Kyunggi-Do (KR)

( * ) Notice: Subject to any disclaimer, the term of this patent is extended or adjusted under 35 U.S.C. 154(b) by 0 days.

(21) Appl. No.: 10/779,435

(22) Filed: Feb. 13, 2004

(65) Prior Publication Data

US 2005/0178869 A1  Aug. 18, 2005

(51) Int. Cl.⁷ ............................................. A01K 89/01
(52) U.S. Cl. ...................................... 242/288; 242/303
(58) Field of Search ............................... 242/288, 302, 242/303, 304

(56) References Cited

U.S. PATENT DOCUMENTS

| | | | | |
|---|---|---|---|---|
| 4,549,703 A | * | 10/1985 | Atobe | 242/288 |
| 4,710,689 A | * | 12/1987 | Uetsuki et al. | 318/630 |
| 4,830,308 A | * | 5/1989 | Puryear | 242/288 |
| 5,556,048 A | * | 9/1996 | Hashimoto | 242/288 |
| 5,996,920 A | * | 12/1999 | Yamaguchi | 242/286 |
| 5,996,921 A | * | 12/1999 | Hogaki et al. | 242/289 |
| 6,086,005 A | * | 7/2000 | Kobayashi et al. | 242/288 |
| 2002/0063181 A1 | * | 5/2002 | Yamaguchi | 242/286 |

* cited by examiner

*Primary Examiner*—Emmanuel M Marcelo
(74) *Attorney, Agent, or Firm*—Notaro&Michalos PC

(57) ABSTRACT

Disclosed is an apparatus for preventing backlash of a spool used in a baitcasting reel. A movable cam 20 assembled to a stationary cam 10 secured to a spool shaft moves in a direction parallel with the spool shaft, when a revolution of the spool is increased. A braking plate 30 approaches a permanent magnet 2a of a spool cover, so that the spool is smoothly and precisely braked.

1 Claim, 5 Drawing Sheets

APPARATUS FOR PREVENTING BACKLASH OF SPOOL USED IN BAITCASTING REEL

BACKGROUND OF THE INVENTION

1. Field of the Invention

The present invention relates to a fishing reel, and more particularly, to an apparatus for preventing backlash of a spool used in a baitcasting reel.

2. Background of the Related Art

In baitcasting reels, if a flying speed of a sinker containing bait does not coincide with an unwinding speed of a fishing line from a spool upon casting, there is a phenomenon that the excessively unwound fishing line is tangled around the spool. In order to prevent the phenomenon, a centrifugal brake for to controlling a rotating speed of the spool is utilized. It is difficult for the conventional centrifugal brake to precisely control braking force. Further, a brake shoe and a braking ring are worn away.

Therefore, it has been proposed a structure for preventing the backlash of the spool by use of a permanent magnet and a braking plate, in which a slider assembled to an inclined surface of the spool is moved toward the permanent magnet by centrifugal force generated from the rotation of the spool, thereby braking the spool. Such a structure is expensive and complicated, and thus its assembly is not easy.

SUMMARY OF THE INVENTION

Accordingly, the present invention is directed to a backlash preventing apparatus for a baitcasting reel that substantially obviates one or more problems due to limitations and disadvantages of the related art.

An object of the present invention is to provide an apparatus for preventing backlash of a spool, in which a decreased phenomenon of carry distance can be improved and a durability of components can be remarkably increased.

To achieve the object and other advantages, according to one aspect of the present invention, there is provide an apparatus for preventing backlash used in a baitcasting reel, the apparatus comprising: a stationary cam including an opening formed at a center thereof through which a shaft of a spool passes, in which a boss of the spool is inserted into the opening to fix the stationary cam, at least two protruded portions formed at an outer periphery thereof, the protruded portion having an inclined surface at a lower portion thereof; a movable cam including protruded portions corresponding to the protruded portions, bosses formed under a bottom of the movable cam, and an opening formed at a center of the cam through which the spool shaft passes, the protruded portion having an inclined surface abutting against the inclined surface of the protruded portion of the stationary cam; a braking plate including holes for receiving bosses of the movable cam and an opening formed at a center of the plate through which the spool shaft passes, in which the braking plate is affected by magnetic force of the permanent magnet so that braking force is applied to the spool; and a spring, secured to the spool shaft by a washer and a snap ring, for compressing the movable cap against the stationary cam.

Alternatively, the braking plate may be replaced by a braking ring of a cylinder tube shape, and the permanent magnet of the spool cover 2 may be replaced by a plurality of permanent magnets arranged around a spool cover in a circle and permanent magnets secured to a ring gear. The braking ring moves between the permanent magnets and the permanent magnets, thereby preventing the backlash of the spool.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

A preferred embodiment according to the present invention will now be explained with reference to the accompanying drawings.

Figure 1:
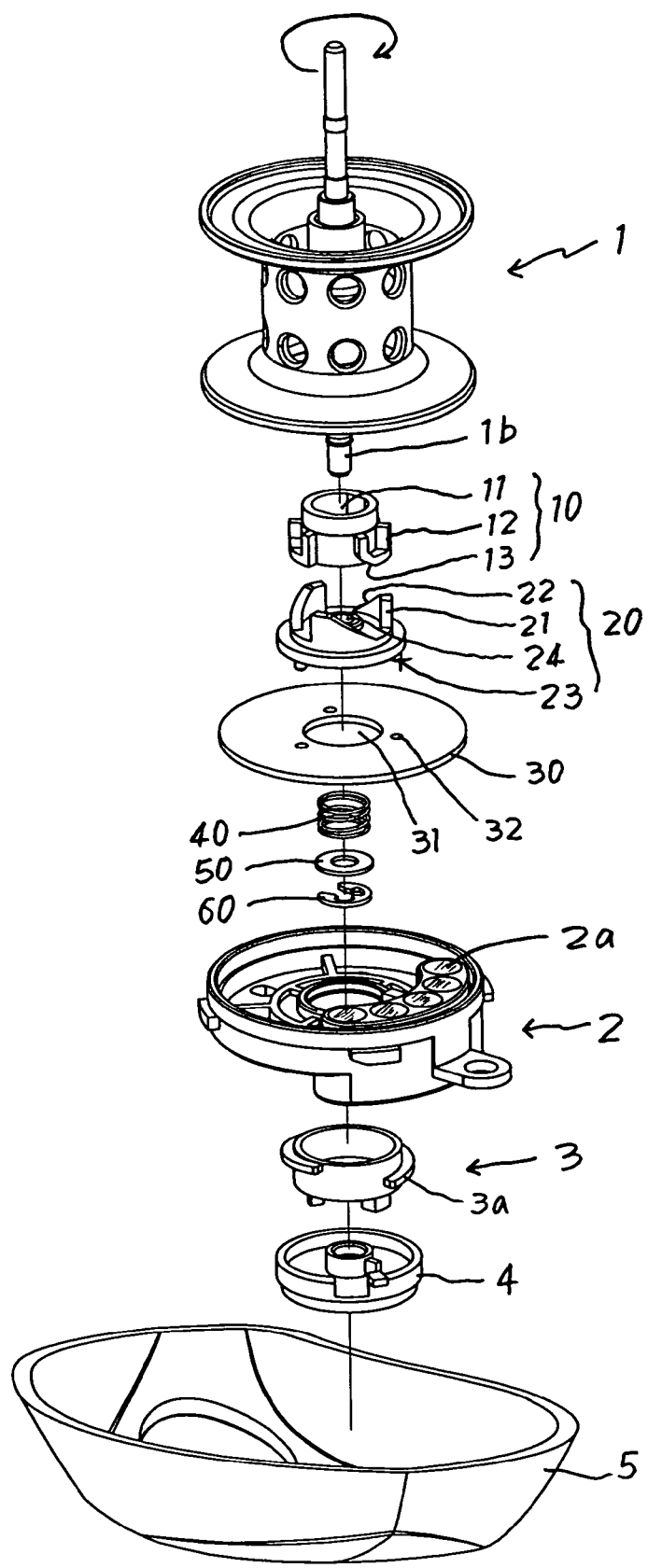
FIGS. 1 and 2 are exploded perspective views of an apparatus for preventing backlash of a spool according to one preferred embodiment of the present invention.
Figure 2:
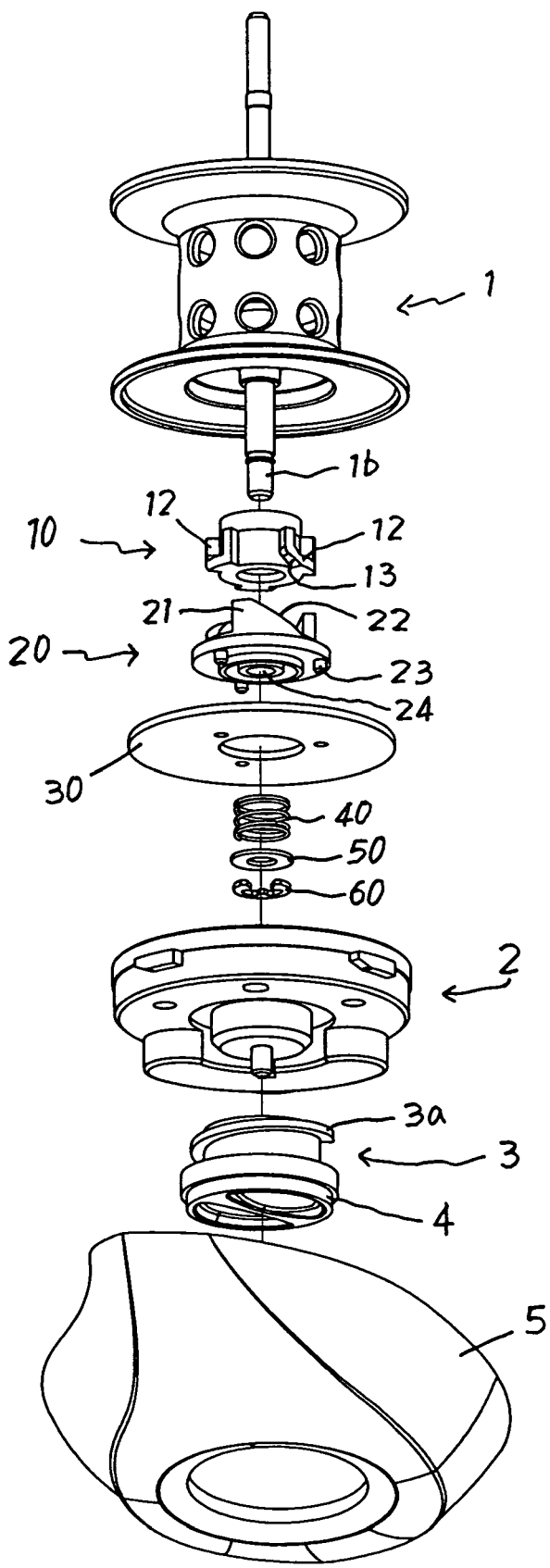

Referring to FIG. 1, an apparatus for preventing backlash of a spool for used in a baitcasting reel according to one preferred embodiment of the present invention includes a stationary cam 10, a movable cam 20 assembled to the stationary cam 10, and a braking plate 30 fixed to the movable cam 20.

The stationary cam 10 is formed with an opening 11 formed at center of the cam through which a shaft 1b of a spool 1 passes, and a boss 1a of the spool 1 is inserted into the opening 11 to fix the stationary cam 10. As shown in the accompanying drawings, the stationary cam 10 is provided at an outer periphery thereof with at least two protruded portions 12. Three protruded portions 12 are provided in this embodiment, but four or five protruded portions 12 may be provided. The protruded portion 12 has an inclined surface 13 at a lower portion of the protruded portion.

The movable cam 20 includes protruded portions 21 corresponding to the protruded portions 12. The protruded portion 21 has an inclined surface 22 abutting against the inclined surface 13 of the protruded portion 12 of the stationary cam 10. Also, the movable cam 20 has bosses 23 formed under a bottom of the movable cam 20 and inserted into holes 32 of the braking plate 30, and an opening 24 at a center of the cam 20 through which the spool shaft 1b passes.

The braking plate 30 has holes 32 for receiving bosses 23 of the movable cam 20, and an opening 31 at a center of the plate 30 through which the spool shaft 1b passes. The braking plate is made of a nonmagnetic material, such as aluminum and an alloy of aluminum, and is called as a magnet plate in the industry.

Figure 3:
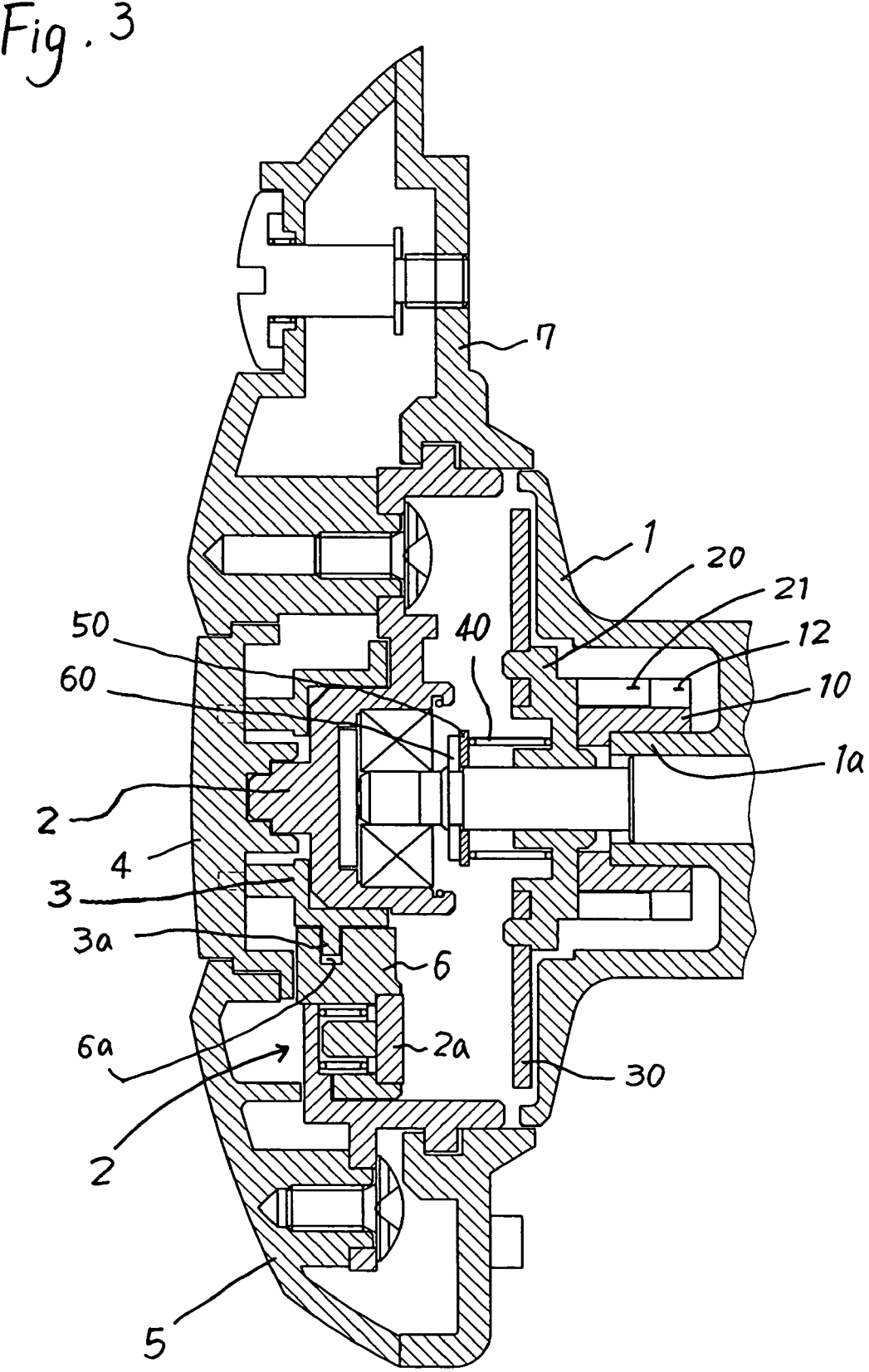
FIGS. 3 and 4 are cross-sectional views of an apparatus for preventing backlash of a spool according to one preferred embodiment of the present invention.

If the stationary cam 10, the movable cam 20 and the braking plate 30 are assembled to the reel, one end of the spool shaft 1b is inserted into a spring 40 in such a way that the spring is contacted to the movable cam 20. The spring 40 is secured to the spool shaft 1b by a washer 50 and a snap ring 60. FIG. 3 shows a case where the spring 40 is slightly compressed. The movable cap 20 with the braking plate 30 fixed is not released from the stationary cam 10 by itself.

Figure 4:
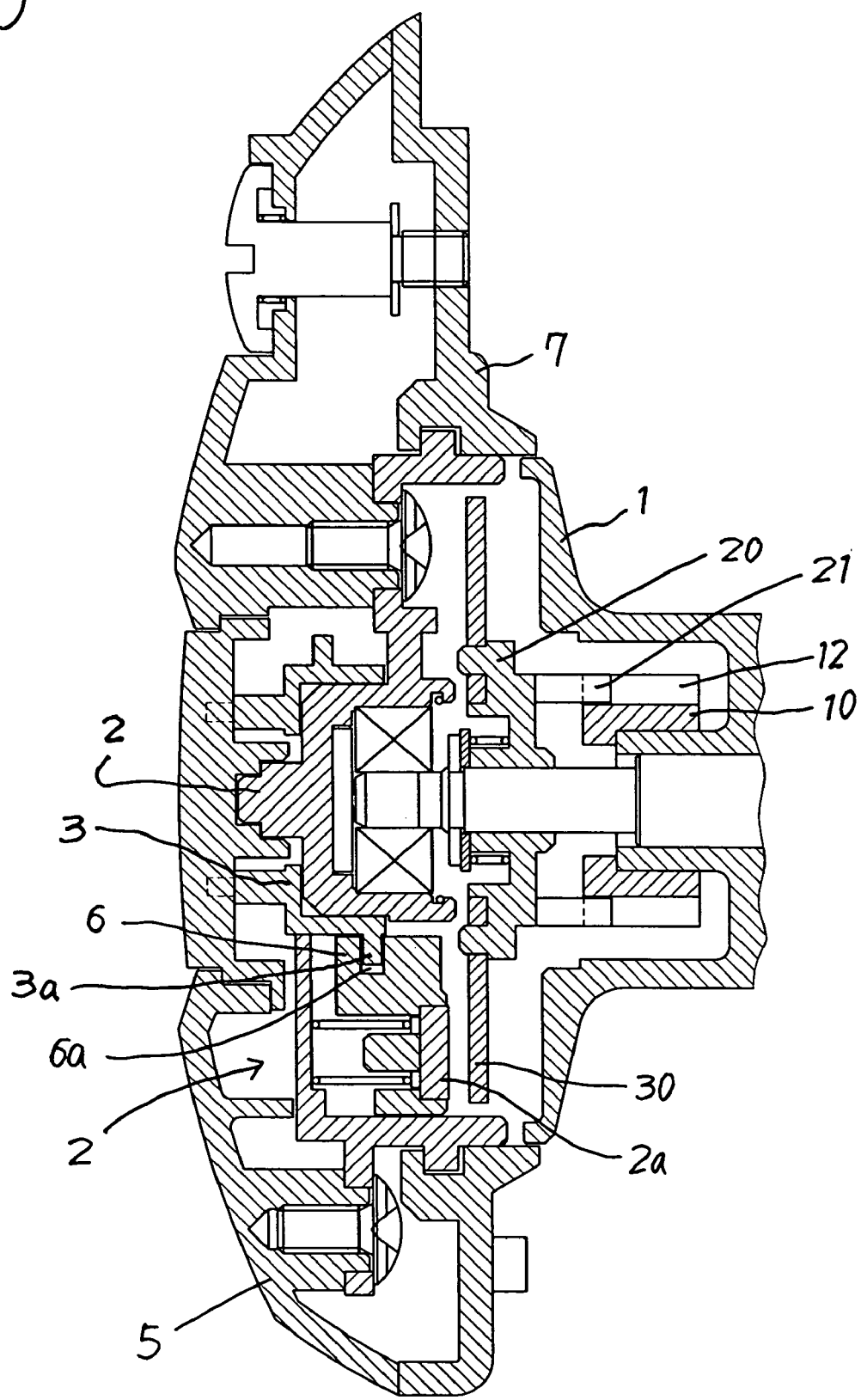

When a fisher casts bait in the state shown in FIG. 3, the movable cam 20 is rotated with the stationary cam 10, with it being not detached from the stationary cam 10, at the early stage in which the spool 1 is rotated. Immediately after the spool 1 is rotated at high speed, the inclined surface 22 of the protruded portion 22 of the movable cam 20 is slid and detached from the inclined surface 13 of the protruded portion 12 of the stationary cam 10. At that time, the movable cam 20 surpasses compression force of the spring 40, and moves toward a spool cover 2 along the spool shaft 1b. Then, when a rotating speed of the spool 1 reached to the maximum level, the movable cam 20 moves to a position closely adjacent to a permanent magnet 2a of the spool cover 2, as shown in FIG. 4. Therefore, the braking plate 30 is affected by magnetic force of the permanent magnet 2a so that braking force is applied to the spool 1. Accordingly, the rotation of the spool 1 is slowly and smoothly reduced, thereby preventing the backlash of the spool 1.

When the rotation of the spool 1 is reduced without producing the backlash, the movable cam 20 is slowly moved toward the stationary cam 10 by the compression force of the spring 40, and the braking plate 30 is returned to its original position together with the movable cam 20, as shown in FIG. 3. Specifically, if the spool 1 is rotated at high speed, the braking plate 30 is moved toward the permanent magnet 2a together with the movable cam 20, as shown in FIG. 4, so that the rotation of the spool 1 is reduced without producing the backlash. At the same time the spool 1 is rotated at medium and low speed, the braking plate 30 is moved away from the permanent magnet 2a, and is returned to its original position, as shown in FIG. 3.

With the structure, the movable cam 20 is not detached from the stationary cam 10 by centrifugal force. The movable cam 20 is stationary at the initial stage, but is moved in parallel with the spool shaft 1b by the movement of inertial when the spool 1 is rotated at the high speed.

If a control member 4 assembled to a side cover 5 is rotated, a slide cam 3 is rotated, and a spiral wing 3a of the slide cam 3 is inserted into a groove 6a formed at a bushing 6 of the spool cover 2. The spool cover 2 and the bushing 6 can be moved toward the braking plate 30, as shown in FIG. 4. The reason is that it is to precisely control operating force of the magnet brake. The present invention can be applied to a centrifugal magnetic brake structure, instead of the shown structure of such magnet plate.

Figure 5:
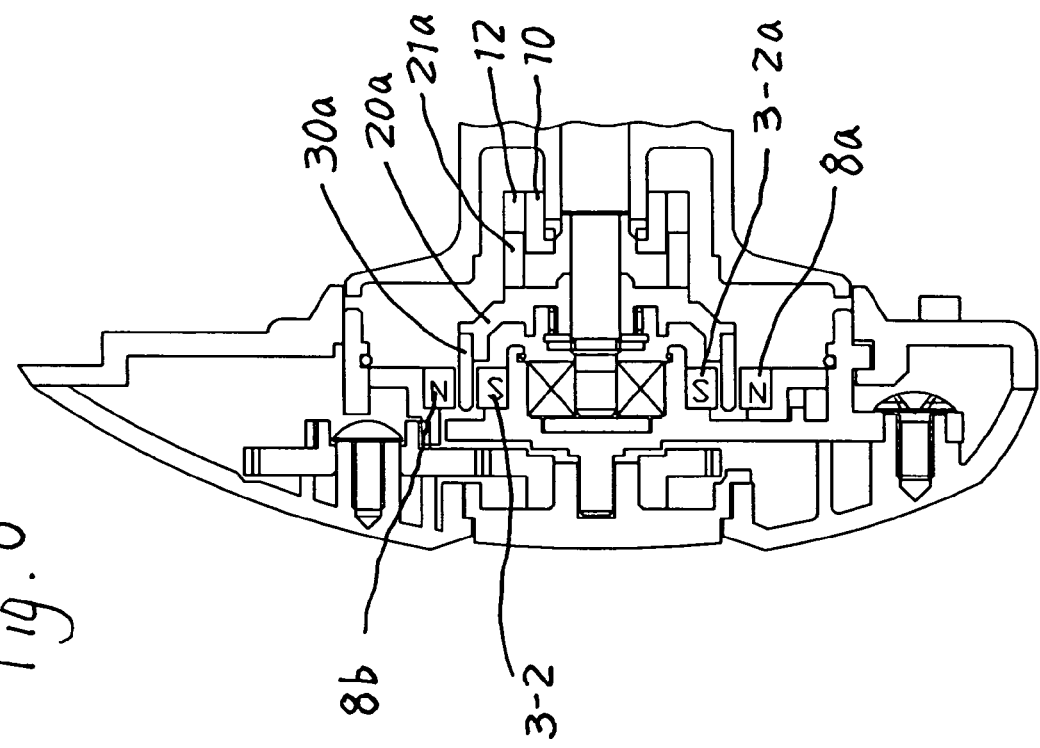
FIGS. 5 and 6 are cross-sectional views of an apparatus for preventing backlash of a spool according to alternative embodiment of the present invention.
Figure 6:
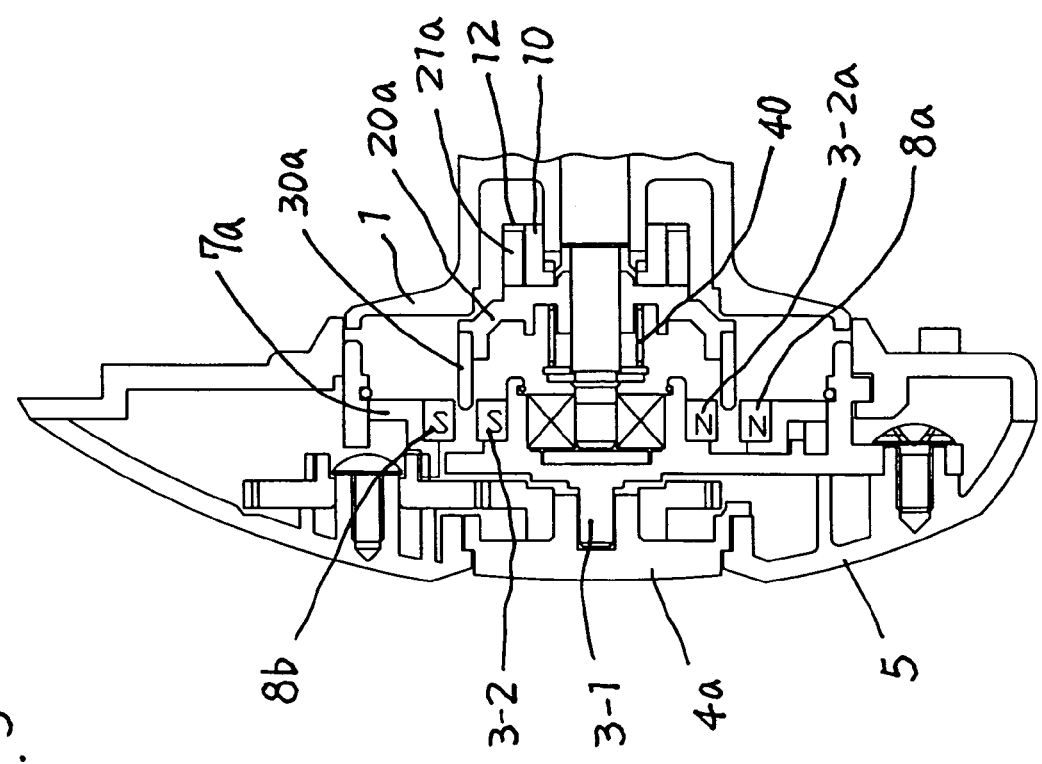

FIGS. 5 and 6 show alternative embodiments of the present invention.

These alternative embodiments are substantially similar to the first embodiment, except that the braking plate 30 is replaced by a braking ring 30a of a cylinder tube shape. The braking ring 30a is secured to an edge of a movable cam 20a, as shown in FIGS. 5 and 6. The permanent magnet 2a of the spool cover 2 of the first embodiment is replaced by a plurality of permanent magnets 3-2 and 3-2a arranged around a spool cover 301 in a circle, and permanent magnets 8a and 8b secured to a ring gear 7a.

According to the alternative embodiments, if the spool 1 is rotated at high speed, the movable cam 20a is detached from the stationary cam 10, as shown in FIGS. 5 and 6. The braking ring 30a moves between the permanent magnets 3-2 and 302a and the permanent magnets 8a and 8b. Therefore, the alternative embodiments perform the same operation as that of the first embodiment, thereby preventing the backlash of the spool 1. The arrangement of the permanent magnets 3-2, 3-2a, 8a and 8b can be applied to a centrifugal magnetic brake structure.

Therefore, various structure of the permanent magnets 2a, 3-2, 3-2a, 8a and 8b can be utilized in the apparatus of the present invention, and the present invention is characterized by the braking plate 30 and the braking ring 30a.

With the structure of the apparatus, the movable cam 20 is not detached from the stationary cam 10 by centrifugal force. The movable cam 20 is stationary at the initial stage, but is moved in parallel with the spool shaft 1b by the movement of inertial when the spool 1 is rotated at the high speed. The apparatus has a simple structure in relation to the magnetic brake structure employing the centrifugal force, and so its cost is inexpensive. Further, the operation of the apparatus can be permanently guaranteed.

Accordingly, the rotation of the spool is controlled more ideally in relation to the prior art, and a decreased phenomenon of carry distance can be improved. Further, a durability of components related to the apparatus for preventing the backlash can be remarkably increased.

The forgoing embodiments are merely exemplary and are not to be construed as limiting the present invention. The present teachings can be readily applied to other types of apparatus. The description of the present invention is intended to be illustrative, and not to limit the scope of the claims. Many alternatives, modifications, and variations will be apparent to those skilled in the art.

What is claimed is:

1. An apparatus for preventing backlash of a spool used in a baitcasting reel, the apparatus comprising:

a stationary cam including an opening formed at a center thereof through which a shaft of the spool passes, in which a boss of the spool is inserted into the opening to fix the stationary cam, and at least two first protruded portions formed at an outer periphery thereof, the first protruded portions having an inclined surface at a lower portion thereof;

a movable cam including further protruded portions corresponding to the first protruded portions, bosses formed under a bottom of the movable cam, and an opening formed at a center of the cam through which the spool shaft passes, the first protruded portions having an inclined surface abutting against the inclined surface of the further protruded portions of the stationary cam;

a breaking plate including holes for receiving the bosses of the movable cam and an opening formed at the center of the plate through which the spool shaft passes, in which the braking plate is affected by a magnetic force of a permanent magnet so that braking force is applied to the spool; and a spring, secured to the spool shaft by a washer and a snap ring, for compressing the movable cam against the stationary cam.

* * * * *